(12) United States Patent
Han et al.

(10) Patent No.: US 6,388,711 B1
(45) Date of Patent: May 14, 2002

(54) APPARATUS FOR CONVERTING FORMAT FOR DIGITAL TELEVISION

(75) Inventors: Dong Il Han, Seoul; Sung Yong Kim, Kyonggi-do, both of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/676,782

(22) Filed: Oct. 2, 2000

(51) Int. Cl.[7] .......................... H04N 7/01; H04N 11/20

(52) U.S. Cl. .................. 348/441; 348/445; 348/458; 348/581; 348/704

(58) Field of Search ....................... 348/441, 445, 348/448, 458, 581, 582, 704; 345/501; H04N 7/01, 11/20, 9/74, 3/223

(56) References Cited

U.S. PATENT DOCUMENTS

| | | | | |
|---|---|---|---|---|
| 5,469,223 A | * | 11/1995 | Kimura ........................ | 348/581 |
| 5,475,442 A | * | 12/1995 | Matsushita et al .......... | 348/554 |
| 5,790,714 A | * | 8/1998 | McNeil et al. ............... | 382/300 |
| 5,825,424 A | * | 10/1998 | Canfield et al. ............. | 348/416 |
| 6,097,438 A | * | 8/2000 | Nagakubo et al. .......... | 348/445 |
| 6,151,425 A | * | 11/2000 | Wakisawa et al. .......... | 382/298 |
| 6,226,039 B1 | * | 5/2001 | Yoon .......................... | 348/445 |
| 6,256,068 B1 | * | 7/2001 | Takada et al. .............. | 348/411 |

* cited by examiner

Primary Examiner—Michael Lee
Assistant Examiner—Brian P. Yenke
(74) Attorney, Agent, or Firm—Birch, Stewart, Kolasch & Birch, LLP

(57) ABSTRACT

A format conversion apparatus for a digital TV includes a block division and control signal generating part for dividing an input image into a plurality of blocks according to an input image size data and an output image size data. A format conversion coefficient generating part generates a format conversion coefficient for converting formats per block according to a control signal output from the block division and control signal generating part. A synchronizing signal generating part generates vertical and horizontal synchronizing signals per block according to a control signal output from the block division and control signal generating part. A format conversion part performs format conversion of image input per block according to the format conversion coefficient and the vertical and horizontal synchronizing signals. Vertical and horizontal format conversion of an input image is performed after dividing the image into a plurality of blocks so that buffer memory and bandwidth requirements for performing the format conversion are reduced simultaneously, while easily increasing a number of taps of a vertical filter. This prevents degradation of resolution generated when reducing a size of an image and realizes a high resolution with simple hardware.

18 Claims, 7 Drawing Sheets

FIG.4A

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

FIG.4B

| 1 | 6 | 11 | 16 | 21 |
|---|---|----|----|----|
| 2 | 7 | 12 | 17 | 22 |
| 3 | 8 | 13 | 18 | 23 |
| 4 | 9 | 14 | 19 | 24 |
| 5 | 10 | 15 | 20 | 25 |

FIG.4C

| 1 | 2 | 3 | 4 | 5 |
|---|---|---|---|---| output block sizes output block sizes

APPARATUS FOR CONVERTING FORMAT FOR DIGITAL TELEVISION

BACKGROUND OF THE INVENTION

1. Field of the Invention

The present invention relates to a digital television, and more particularly to, an apparatus for converting a format for a digital television.

2. Description of the Related Art

According to the introduction of digital TVs and various display apparatuses, more various kinds of images become possible to be input and output in comparison with an existing analogue TVs. In order to convert input images of various sizes into output images of different sizes, a format conversion apparatus is essential and in order to obtain a high resolution output, proper filtering should be performed in vertical and horizontal directions, according to a ratio of input and output images.

Now, related arts will be described with reference to appended drawings.

FIG. 1 is a block diagram showing an apparatus for converting a format for digital TVs, according to the background art. The apparatus includes a first line memory 1 and a second line memory 2 for temporarily storing input image signals, a vertical format converter 3 for converting vertical components included in the image signals output from the first line memory 1 and the second line memory 2 in a predetermined format, a horizontal filter 4 for filtering horizontal components included in the image signals of which format is vertically converted by the vertical format converter 3 by a predetermined bandwidth, a horizontal format converter 5 for outputting the image signals filtered by the horizontal filter 4 after converting into a predetermined format, and a memory 6 for storing input images for format conversion and outputs to the first and second line memories 1, 2 and displaying the image of which format is converted in the horizontal format converter 5.

In FIG. 1, the input image signals are stored in the memory 6 and then outputted to the first and second line memories 1, 2 for format conversion. The first and second line memories 1, 2 store the image signals output from the memory 6 temporarily and output to the vertical format converter 3.

The vertical format conversion element 3 converts the vertical components included in the image signals which are output from the first and second line memories 1, 2 into an output image size and outputs to the horizontal filter 4.

The horizontal filter 4 filters the horizontal components included in the image signals which are converted and output by the vertical format conversion element 3 and outputs to the horizontal format conversion element 5. That is, the horizontal filter 4 limits the bandwidth of the input image for preventing aliasing possibly generated when reducing the input image in the horizontal direction. The image signals, which are filtered in the horizontal direction, are stored in the memory 6 after the horizontal format conversion by the horizontal format conversion element 5 in accordance with the output size.

At this time, if the line memories as shown in FIG. 1 are utilized, waste of the memory is increased. That is, an amount of required hardware is increased since the size of the respective line memories is determined by the size of input images, which are not converted in format. In particular, when processing images of high definition television (HDTV) receivers, line memories corresponding to the high-resolution images are required so that an amount of a total hardware is extremely increased.

If buffers are adopted to avoid this disadvantage, even though the size of the hardware may be reduced but a relatively larger memory bandwidth is required. That is, in case that buffers are adopted, vertical filters of a plurality of taps should be used for obtaining a high resolution and the memory bandwidth is greatly increased. Therefore, the vertical filtering is imitatively used in an expensive system. Finally, low price systems, which can not adopt the vertical filtering, can not obtain an image quality as required.

SUMMARY OF THE INVENTION

An object of the invention is to solve at least the above problems and/or disadvantages and to provide at least the advantages described hereinafter.

Another object of the present invention is to provide an apparatus for converting a format of digital TVs in which input images are divided into a plurality of blocks and the respective blocks are converted in vertical and horizontal directions.

To achieve at least these and other advantages in whole or in parts there is provided an apparatus for converting a format for a digital TV, comprising, a block division and control signal generating part for dividing an input image into a plurality of blocks according to an input image size data and an output image size data, and generating a control signal for performing format conversion per the divided blocks; a format conversion coefficient generating part for generating a format conversion coefficient for converting formats per block according to a control signal output from the block division and control signal generating part; a synchronizing signal generating part for generating vertical and horizontal synchronizing signals per block according to a control signal output from the block division and control signal generating part; and a format conversion part for performing format conversion per block according to the format conversion coefficient generated from the format conversion coefficient generating part and the vertical and horizontal synchronizing signals generated from the synchronizing signal generating part.

The blocks divided in the block division and control signal generating part is overlapped with other neighboring blocks in part.

The apparatus for converting a format for a digital TV further comprises a read/write address generating part for generating a read address and a write address according to a control signal output from the block division and control signal generating part, and a memory for performing read/write of an input image according to the read address and the write address, wherein blocks read in the format conversion part according to the read address is read by overlapping with neighboring blocks in part, and blocks which are written after the format conversion are written without overlapping with neighboring blocks according to the write address.

The block division and control signal generating part determines a block size when dividing an input image into a plurality of blocks according to a memory bandwidth.

The block division and control signal generating part determines a horizontal direction size of the respective blocks to be slightly smaller than a pixel number able to be brought by a signal memory read operation.

The format conversion coefficient generating part generates format conversion coefficients in such a manner that a format conversion coefficient at a starting point of the respective blocks which are divided from an input image into a plurality of blocks under the control of the block division and control signal generating part is in conformity with a format conversion coefficient at a point when the input image is processed by a single block.

The synchronizing signal generating part generates vertical and horizontal synchronizing signals equal or different for the respective blocks, which are divided under the control of the block division, and control signal generating part.

The format conversion part comprises a memory buffer part including a plurality of buffers for temporarily storing images input per block unit, a vertical format conversion part for converting an image signal output from the memory buffer part in the vertical direction according to a format conversion coefficient generated from the format conversion coefficient generating part and a vertical synchronizing signal generated from the synchronizing signal generating part, and a horizontal format conversion part for converting an image signal output from the vertical format conversion part in the horizontal direction according to a format conversion coefficient generated from the format conversion coefficient generating part and a horizontal synchronizing signal generated from the synchronizing signal generating part.

The block division and control signal generating part determines a block size according to a size of the memory buffer when dividing the input image into a plurality of blocks.

The plurality of buffers in the memory buffer part is disposed in parallel, and a number of the buffers is determined by a number of taps of the vertical filter at a rear end.

The block division and control signal generating part divides a horizontal direction size of a block to be smaller than a pixel number stored in a single buffer when dividing the input image into a plurality of blocks.

The apparatus for converting a format for a digital TV includes a block division and control signal generating part for dividing an input image into a plurality of blocks according to an input image size data, an output image size data and an input and output size data of each block, and generating a control signal for performing format conversion per the divided blocks, a format conversion coefficient generating part for generating a format conversion coefficient for converting formats per block according to a control signal output from the block division and control signal generating part, a synchronizing signal generating part for generating vertical and horizontal synchronizing signals per block according to a control signal output from the block division and control signal generating part, and a format conversion part for performing format conversion per block according to the format conversion coefficient generated from the format conversion coefficient generating part and the vertical and horizontal synchronizing signals generated from the synchronizing signal generating part.

The apparatus for converting a format of a digital TV further includes a read/write address generating part for generating a read address and a write address according to a control signal output from the block division and control signal generating part, and a memory for performing read/write of an input image according to the read address and the write address, wherein blocks read in the format conversion part according to the read address is read by overlapping with neighboring blocks in part, and blocks which are written after the format conversion are written without overlapping with neighboring blocks according to the write address.

The blocks divided in the block division and control signal generating part are overlapped with other neighboring blocks in part.

The format conversion coefficient generating part generates format conversion coefficients differently for the respective blocks which are divided under the block division and control signal generating part for performing the format conversion of blocks with different input and output sizes.

The synchronizing signal generating part generates vertical and horizontal synchronizing signals differently for the respective blocks which are divided under the control of the block division and control signal generating part for performing the format conversion of blocks with different input and output sizes.

The format conversion part includes a memory buffer part including a plurality of buffers for temporarily storing images input per block unit, a vertical format conversion part for converting an image signal output from the memory buffer part in the vertical direction according to a format conversion coefficient generated from the format conversion coefficient generating part and a vertical synchronizing signal generated from the synchronizing signal generating part, and a horizontal format conversion part for converting an image signal output from the vertical format conversion part in the horizontal direction according to a format conversion coefficient generated from the format conversion coefficient generating part and a horizontal synchronizing signal generated from the synchronizing signal generating part.

A vertical filter and a horizontal filter are provided respectively at a front end part of the vertical format conversion part and a front end part of the horizontal conversion part for limiting bandwidth of an input image.

According to the present invention, input images are divided into a plurality of blocks and the blocks are converted vertically and horizontally in the format by using the buffers like the line memories, so that the buffer memory and the bandwidth required for the format conversion are simultaneously reduced greatly, thereby preventing degradation of resolution generated when reducing a size of an image and realizing a high resolution with simple hardware.

BRIEF DESCRIPTION OF THE DRAWINGS

The invention will be described in detail with reference to the following drawings in which like reference numerals refer to like elements wherein:

FIG. 4a illustrates a first processing sequence for the blocks;

FIG. 4b illustrates a second alternative processing sequence for the blocks;

FIG. 4c illustrates a third alternative processing sequence for the blocks;

DESCRIPTION OF THE PREFERRED EMBODIMENTS

Figure 1:
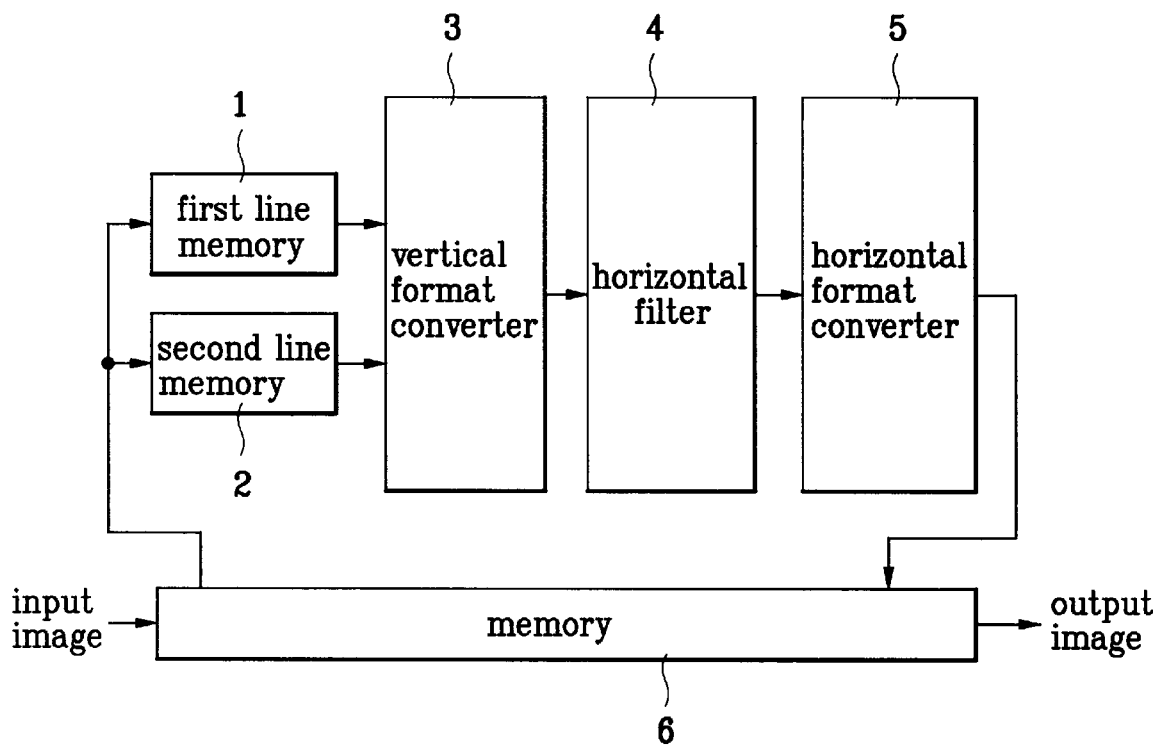
FIG. 1 is a block diagram of a background art apparatus for converting a format of a digital TV.
Figure 2:
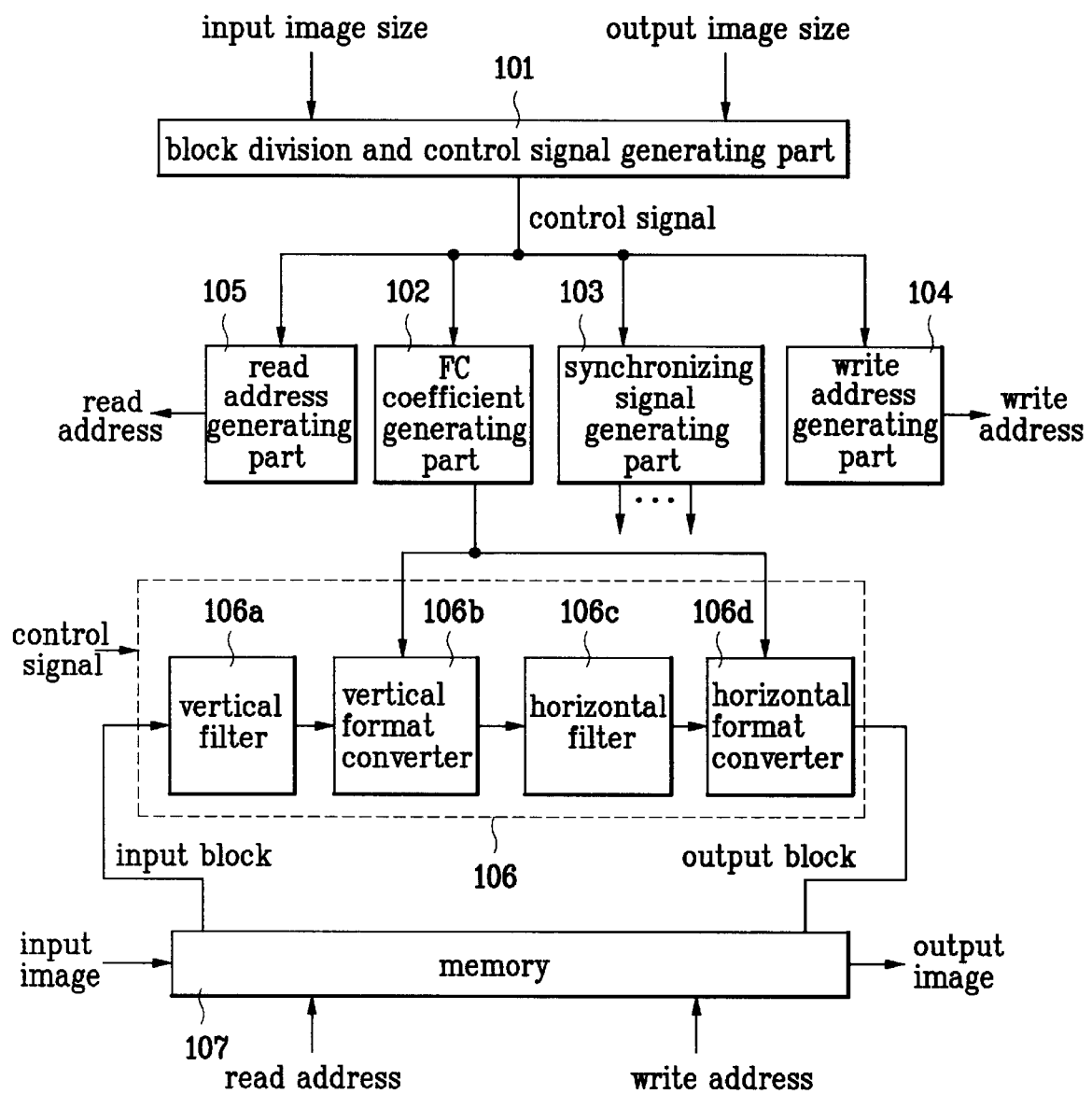
FIG. 2 is a block diagram of an apparatus for converting a format of a digital TV according to a preferred embodiment of the present invention.

FIG. 2 is a block diagram of an apparatus for converting a format of a digital TV according to a preferred embodiment of the present invention, in which the apparatus for converting a format of a digital TV includes a block division and control signal generating part 101 for dividing an input image into a plurality of blocks according to input image size data and output image size data, and generating a control signal for performing format conversion per the divided blocks, a format conversion (FC) coefficient generating part 102 for generating a format conversion coefficient for converting formats per block according to a control signal output from the block division and control signal generating part 101, a synchronizing signal generating part 103 for generating vertical and horizontal synchronizing signals per block according to a control signal output from the block division and control signal generating part 101, a write address generating part 104 for generating a write address to write the input images of the divided blocks to a memory 107 according to a control signal output from the block division and control signal generating part 101, a read address generating part 105 for generating a read address to read the input images of the divided block which are stored in the memory 107 according to a control signal output from the block division and control signal generating part 101, and a format conversion part 106 for performing format conversion per block divided in the block division and control signal generating part 101 according to the format conversion coefficient generated from the format conversion coefficient generating part 102 and the vertical and horizontal synchronizing signals generated from the synchronizing signal generating part 103.

The format conversion part 106 includes a vertical filter 106*a* for filtering vertical components included in the input images per block with a predetermined bandwidth, a vertical format converter 106*b* for converting the format of the image signal filtered in the vertical filter 106*a* in a vertical direction according to a format conversion coefficient generated in the format conversion coefficient generating part 102 and a vertical synchronizing signal generated in the synchronizing signal generating part 103, a horizontal filter 106*c* for filtering horizontal components included in the image signal, which is converted in the vertical format by the vertical format converter 106*b*, with a predetermined bandwidth, and a horizontal format converter 106*d* for converting the format of the image signal filtered in the horizontal filter 106*a* in the horizontal direction according to a format conversion coefficient generated in the format conversion coefficient generating part 102 and a horizontal synchronizing signal generated in the synchronizing signal generating part 103.

Wherein, the vertical filter 106*a* or the horizontal filter 106*c* may alternatively be used or unused, but both filters are used in this embodiment of the present invention.

That is, the vertical filter 106*a* or the horizontal filter 106*c* are used for preventing aliasing, possibly generated in output images, by limiting bandwidth of the input images when reducing the input images in the vertical or horizontal direction.

Figure 3A:
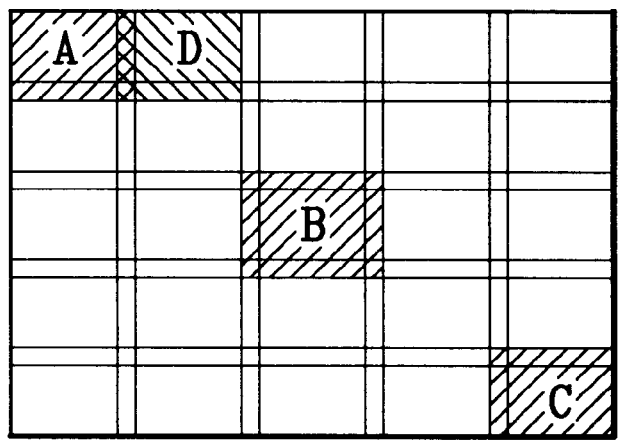
FIG. 3a is a view showing an input, signal image divided into overlapping blocks.
Figure 3B:
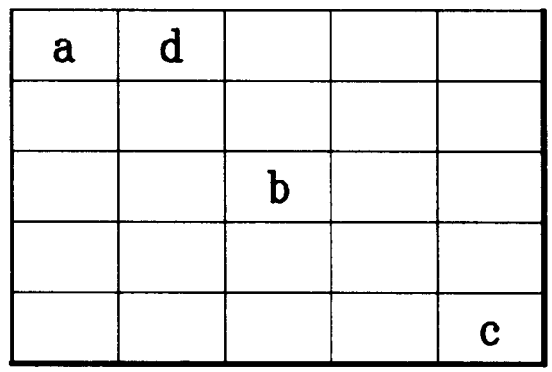
FIG. 3b is a view showing an output signal image, having a different format relative to the input image signal, divided into blocks which do not overlap.

FIG. 3*a* and FIG. 3*b* are views respectively showing blocks divided in the block division and control signal generating part 101 and output signals using the divided blocks. FIG. 4*a* and FIG. 4*b* are views of a processing procedure of the blocks divided in the block division and control signal generation part 101;

According to the present invention constructed as above, the block division and control signal generation part 101 outputs a control signal for dividing the input images into a plurality of blocks according to the input image size data and the output image size data.

At this time, the blocks divided in the block division and control signal generating part 101 are overlapped with other neighboring blocks in part. For example, with blocks "A" and "D" as shown in FIG. 3*a*, the block division and control signal generating part 101 outputs a signal to overlap certain parts of the blocks "A" and "D".

That is, an amount of the input image data is necessary more than an amount of the output image data for filtering and format conversion. In particular, as for the horizontal and vertical format conversion, data of left and right parts of the image are more required so that the block diagram and control signal generating part 101 outputs a control signal to overlap neighboring images more or less as shown in FIG. 3*a*. Then, the read address generating part 105 generates a read address per block to overlap a certain part with neighboring blocks to output to the memory 107. Also, the FC coefficient generating part 102 generates a format conversion coefficient, and the synchronizing signal generating part 103 generates vertical and horizontal synchronizing signals to output to the vertical format converter 106*b* and the horizontal format converter 106*d*.

At this time, output image blocks, of which the format is converted, are not required to overlap as shown in FIG. 3*b*. A single whole image may be obtained by connecting all the output block images. The write address generating part 104 generates a write address under the control of the block division and control signal generating part 101 and outputs the write address to the memory 107. For example, block "A" as shown in FIG. 3*a* is subject to a format conversion and stored in the memory with block "a" as shown in FIG. 3*b*, Similarly, block "B" of FIG. 3*a* is stored in the memory with block "b" of FIG. 3*b*, block "C" of FIG. 3*a* is stored with block "c" of FIG. 3*b*, and block "D" of FIG. 3*a* is stored with block "d" of FIG. 3*b*.

When dividing the input images with a plurality of blocks, the block division and control signal generating part 101 determines a size of blocks according to a memory buffer size, or a necessary memory bandwidth. If the size of the block becomes larger, the memory buffer size should be enlarged but the memory bandwidth is increased smaller than in case of the line memory. On the other hand, if the block size becomes smaller, the memory buffer size is preferably reduced, but the memory bandwidth is relatively largely increased. In general, a minimum memory amount and a minimum memory bandwidth may be obtained by determining a horizontal size of the block to be slightly smaller than a pixel number obtained by a memory read operation.

Figure 5:
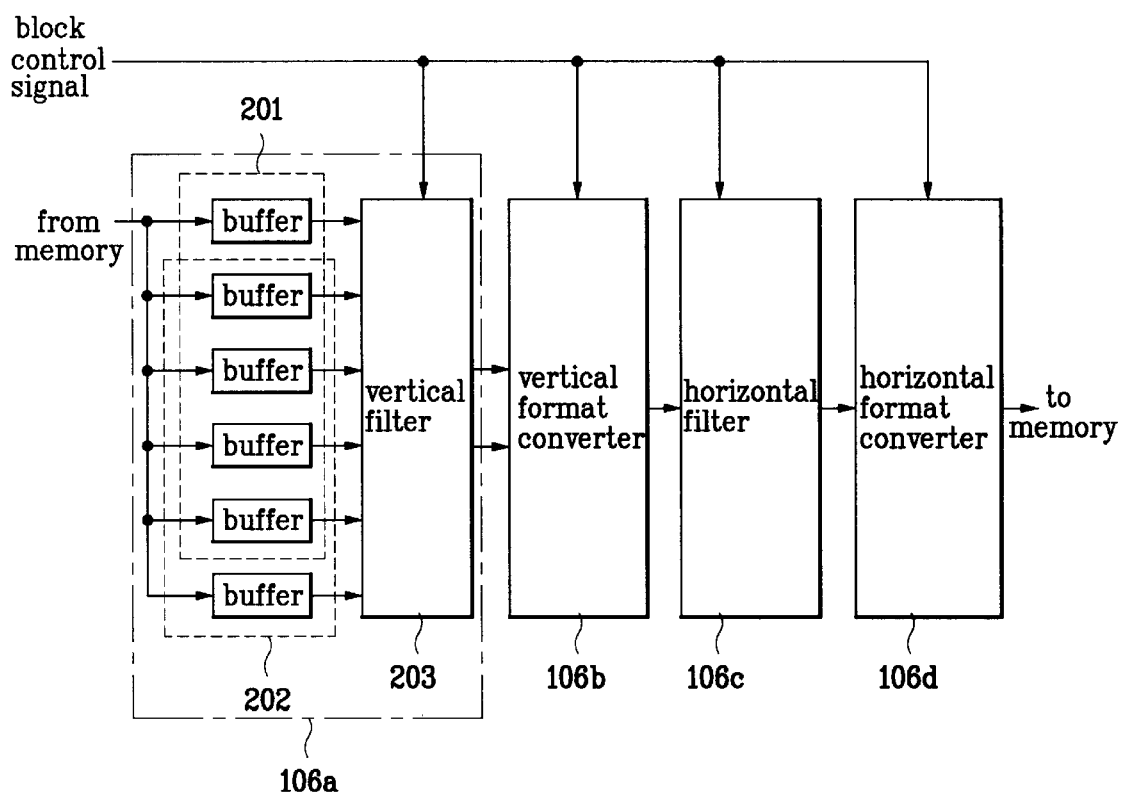
FIG. 5 is a detailed block diagram of an apparatus for converting a format for a digital TV according to the present invention.

The memory buffer may be included in the vertical filter 106*a* of the format conversion part 106, as shown in FIG. 5, or separately provided from the vertical filter 106*a*.

Then, the read address generating part 105 generates a read address to the memory 107, according to the determined block size and a processing sequence. Then, the image signals stored in the memory 107 are read by a block unit, according to the read address to be inputted to the vertical filter 106a of the format conversion part 106.

The divided blocks may be processed in various sequences as shown in FIGS. 4a–4c. If the divided blocks are processed in sequence, as shown in FIG. 4a, the most effective format conversion may be performed. If the input images are to be MPEG decoded or input in sequence of lines as NTSC images, the format conversion may be advantageously performed in synchronization with the input images. According to this method, an optimum format conversion may be performed in any case. Also, if the images are stored in the memory 107, the format conversion may be performed as shown in FIG. 4b, which may perform the format conversion equally in the case as shown in FIG. 4c, and advantageously reduce the memory bandwidth since a part to be read by overlapping in the vertical direction may be removed.

The FC coefficient generating part 102 generates FC coefficients required for the vertical and horizontal format conversion per the divided block. That is, as shown in FIG. 4a to FIG. 4c, the FC coefficient generating part 102 generates the FC coefficients according to the divided blocks.

Particularly, the FC coefficient generating part 102 generates FC coefficients required around borders of the divided areas. Since a single input image is divided into a plurality of blocks, an FC coefficient at boundary points of the respective blocks should be in conformity with an FC coefficient at points when the input image is processed by a single block. By doing so, a format conversion result with a single block becomes equal to a format conversion result with a plurality of blocks in a single input image. 581 The synchronizing signal generating part 103 generates vertical and horizontal signals per the divided block under the control of the block division and control signal generating part 101, wherein the format conversion is performed by the respective divided blocks, a length of the vertical and the horizontal synchronizing signals required for the respective divided blocks may be different. Therefore, the synchronizing signal generating part 103 generates vertical and horizontal synchronizing signals for the respective divided blocks in consideration of the difference.

On the other hand, the format conversion part 106 performs the format conversion of images input by the block unit according to the FC coefficient generated in the FC coefficient generating part 102 and the vertical and horizontal synchronizing signals output from the synchronizing signal generating part 103. Then, the memory 107 stores the respective blocks not to be overlapped, according to the write address generated from the write address generating part 104, as shown in FIG. 3b.

At this time, the format conversion part 106 may alternatively use the vertical filter 106a of the format conversion part. However, in the case of the format conversion via the block division, as an example, if the block "D" is processed after the block "A" as shown in FIG. 3a, the filtering result at a right end part of the block "A" should be equal with the filtering result at a corresponding position of the block "D", otherwise the format conversion result with the plurality of blocks becomes different from that with a single block.

If the vertical filter 106a is used and the number of the vertical filter tap 106a is five, then the memory buffer may include a first memory buffer 201 and a second memory buffer 202, each having five buffers, as shown in FIG. 5.

That is, the number of buffers included in the first and second memory buffers 201 and 202 is different depending on the tap number of the vertical filter 106a.

In order to optimize the memory bandwidth, an image in a same position in the memory 107 should be prevented from being read repeatedly. Therefore, as shown in FIG. 5, the first and second memory buffers 201 and 202 are used like the line memories to use the images stored in the buffer through several lines by dividing blocks to have a smaller horizontal size than the number of pixel stored in a buffer.

That is, the vertical filter 106a in the format conversion part 106 prevents the aliasing, which may be generated in the output image, by limiting the bandwidth of the images output from the first and second memory buffers 201 and 202, and the output from the vertical filter 106a is input to the vertical format converter 106b.

The vertical format converter 106b converts the vertical format of the image signal, which is filtered in the vertical filter 106a, according to the FC coefficient generated in the FC coefficient generating part 102 and the vertical synchronizing signal generated from the synchronizing signal generating part 103 and outputs to the horizontal filter 106c.

The horizontal filter 106c prevents the aliasing by limiting the bandwidth of images to be output from the vertical format converter 106b before the horizontal format conversion. The horizontal format converter 106d converts the horizontal format of the image signal, which is filtered in the horizontal filter 106c, according to the FC coefficient generated from the FC coefficient generating part 102 and the horizontal synchronizing signal generated in the synchronizing signal generating part 103 and outputs to the memory 107.

That is, the format conversion part 106 performs most effective format conversion per the blocks divided in the block division and control signal generating part 101 according to the FC coefficients generated in the FC coefficient generating part 102 and the vertical and horizontal synchronizing signals generated in the synchronizing signal generating part 103.

By doing so, a same image is read once more only in boundary parts and the required amount of the memory bandwidth is similar to the line memories. Further, the required amount of hardware is greatly reduced by using buffers instead of the line memories. Even though a control part for the block division is added and accordingly the hardware is added therefor, such increase of the hardware is negligible in consideration of the reduction of the hardware due to the substitution of the line memories to the buffers.

Figure 7A:
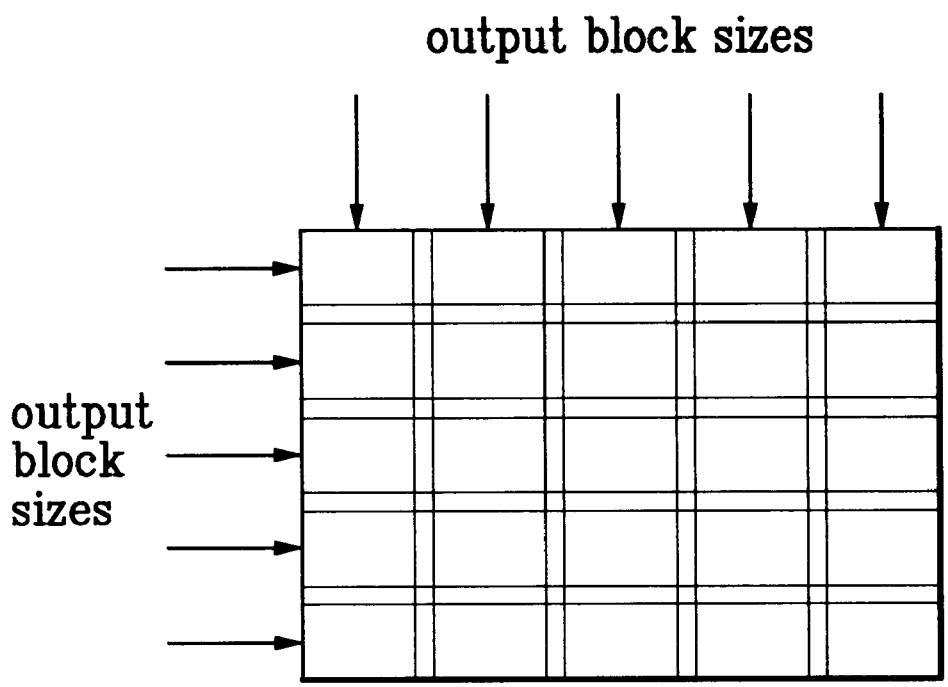
FIG. 7*a* is a view showing an input signal image signal divided into blocks with different output block size settings per block.
Figure 7B:
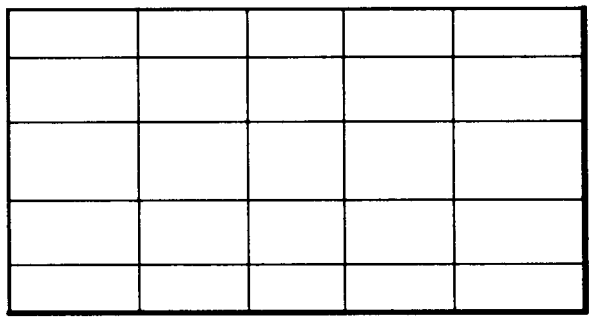
FIG. 7*b* is a view showing an output signal image divided into blocks, in accordance with the block size settings.

On the other hand, as shown in FIGS. 7a–7b, if the input and output sizes are assigned differently per the divided block, various additional image processing effects may be obtained. That is, by dividing the input images into a plurality of blocks, the blocks may be linearly or non-linearly expanded or reduced.

For example, in the case that an input image having a screen ratio of 4:3 is converted in its format to an output image having a screen ratio of 16:9, it is possible to linearly expand the horizontal components of the input image after assigning the input and output sizes per the divided block equally. As shown in FIG. 7a and FIG. 7b, a non-linear output image may be obtained by expanding the blocks positioned in the center at a low ratio and expanding the blocks positioned at the edge parts at a high ratio. Similar adjustment is also possible in the vertical direction.

Figure 6:
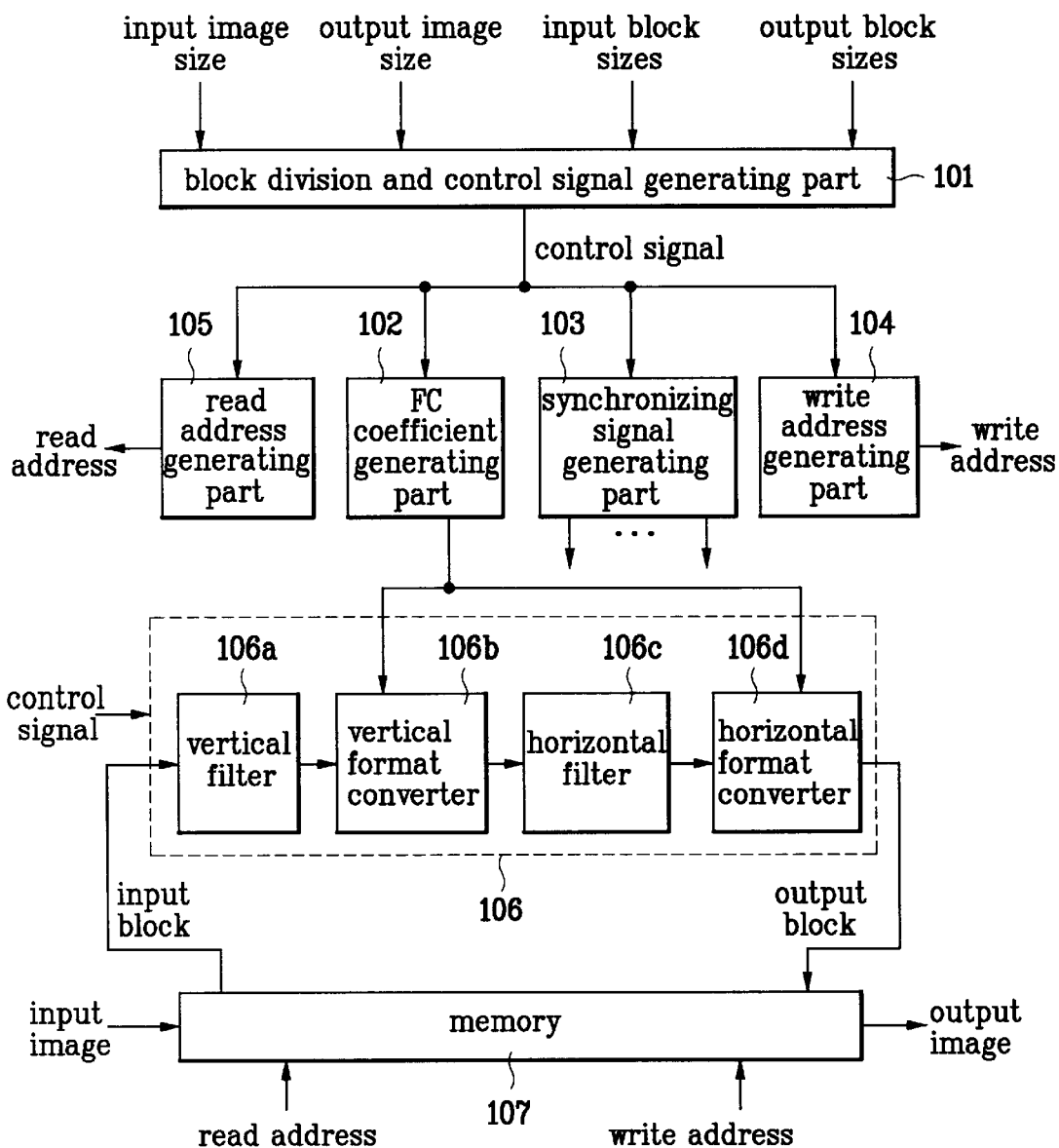
FIG. 6 is a block diagram of an apparatus for converting a format for a digital TV according to another preferred embodiment of the present invention.

The block division and control signal generating part 101 performs the block division and generation of control signals by receiving input image and block size data and output image and block size data of both input and output images as shown in FIG. 6. The operations are similar to those of FIG. 2. That is, the FC coefficient generating part 102 generates different FC coefficients per the divided block according to a control signal of the block division and control signal generating part 101.

The synchronizing signal generating part 103 generates different vertical and horizontal signals per the divided block according to a control signal of the block division and control signal generating part 101. The format conversion part 106 performs the format conversion of the images input by the block unit according to the FC coefficient and the vertical and horizontal synchronizing signals, thereby the images of which screen ratios are different are output as shown in FIG. 7b.

As described hereinabove, the apparatus for converting a format for a digital TV according to the present invention has several effects.

First, buffer memory and bandwidth required for the format conversion may be reduced simultaneously by performing the vertical and horizontal format conversions after dividing input images into a plurality of blocks. Accordingly, the tap number of the vertical filter may be simply increased and, as a result, the degradation of resolution generated when reducing the image size is prevented, so that a high resolution screen may be realized with a simple hardware construction.

Second, a screen ratio conversion system for converting an input image having a screen ratio of 4:3 to an output image having a screen ratio of 16:9 or vice versa may be simply constructed without any additional hardware.

The foregoing embodiments and advantages are merely exemplary and are not to be construed as limiting the present invention. The present teaching can be readily applied to other types of apparatuses. The description of the present invention is intended to be illustrative, and not to limit the scope of the claims . Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for converting a format for a digital TV, comprising:
   a block division and control signal generating part for dividing an input image into a plurality of blocks according to an input image size data and an output image size data, and generating a control signal for performing format conversion per the divided blocks;
   a format conversion coefficient generating part for generating a format conversion coefficient for converting formats per block according to a control signal output from the block division and control signal generating part;
   a synchronizing signal generating part for generating vertical and horizontal synchronizing signals per block according to a control signal output from the block division and control signal generating part; and
   a format conversion part for performing format conversion per block according to the format conversion coefficient generated from the format conversion coefficient generating part and the vertical and horizontal synchronizing signals generated from the synchronizing signal generating part, wherein the blocks divided in the block division and control signal generating part are overlapped with neighboring blocks in part.

2. An apparatus for converting a format for claim 1, further comprising a read/write address generating part for generating a read address and a write address according to a control signal output from the block division and control signal generating part, and a memory for performing read/write of an input image according to the read address and the write address, wherein blocks read in the format conversion part according to the read address is read by overlapping with neighboring blocks in part, and blocks which is written after the format conversion are written without overlapping with neighboring blocks according to the write address.

3. An apparatus for converting a format for claim 2, wherein the block division and control signal generating part determines a horizontal direction size of the respective blocks to be slightly smaller than a pixel number able to be brought by a signal memory read operation.

4. An apparatus for converting a format for claim 2, wherein the read address generating part generates a read address for performing format conversion by sequentially reading the blocks in a horizontal direction under the control of the block division and control signal generating part.

5. An apparatus for converting a format for claim 2, wherein the read address generating part generates a read address for performing format conversion by sequentially reading the blocks in a vertical direction under the control of the block division and control signal generating part.

6. An apparatus for converting a format for claim 1, wherein he format conversion coefficient generating part generates format conversion coefficients in such a manner that a format conversion coefficient at boundary points of the respective blocks which are divided from an input image in to a plurality of blocks under the control of the block division and control signal generating part is in conformity with a format conversion coefficient at points when the input image is processed by a single block.

7. An apparatus for converting a format for claim 1, wherein the synchronizing signal generating part generates vertical and horizontal synchronizing signals equal or different for the respective blocks which are divided under the control of the block division and control signal generating part.

8. An apparatus for converting a format for claim 1, wherein the format conversion part comprises:
   a memory buffer Dart including a plurality of buffers for temporarily processing images per block unit;
   a vertical format conversion part for converting an image signal output from the memory buffer part in the vertical direction according to a format conversion coefficient generated from the format conversion coefficient generating part and a vertical synchronizing signal generated from the synchronizing signal generating part; and
   a horizontal format conversion part for converting can image signal output from the vertical format conversion part in the horizontal direction according to a format conversion coefficient generated from the format conversion coefficient generating part and a horizontal synchronizing signal generated from the synchronizing signal generating part.

9. An apparatus for converting a format for claim 8, further comprising a vertical filter and a horizontal filter respectively at a front end part of the vertical format conversion part and a front end part of the horizontal conversion part for limiting bandwidth of an input image.

10. An apparatus for converting a format for claim 8, wherein the block division and control signal generating part determined a block size according to a size of the memory buffer when dividing the input image into a plurality of blocks.

11. An apparatus for converting a format for claim 8, wherein the plurality of buffers in the memory buffer part are disposed in parallel, and a number of the buffers is determined by a number of taps of the vertical filter at a rear end.

12. A format conversion apparatus for a digital TV, comprising:

a block division and control signal generating part for dividing an input image into a plurality of blocks according to an input image size data, an output image size data and input and output size data of each block, and generating a control signal for performing format conversion per the divided blocks;

a format conversion coefficient generating part for generating a format conversion coefficient for converting formats per block according to a control signal output from the block division and control signal generating part;

a synchronizing signal generating part for generating vertical and horizontal synchronizing signals per block according to a control signal output from the block division and control signal generating part; and a format conversion part for performing format conversion per block according to the format conversion coefficient generated from the format conversion coefficient generating part and the vertical and horizontal synchronizing signals generated from the synchronizing signal generating part, wherein the blocks divided in the block division and control signal generating part are overlapped with neighboring blocks in part.

13. An apparatus for converting a format for claim 12, further comprising a read/write address generating part for generating a read address and a write address according to a control signal output from the block division and control signal generating part, and a memory for performing read/write of an input image according to the read address and the write address, wherein blocks read in the format conversion part according to the read address is read by overlapping with neighboring blocks in part, and blocks which is written after the format conversion are written without overlapping with neighboring blocks according to the write address.

14. An apparatus for converting a format for claim 12, wherein the format conversion coefficient generating part generates format conversion coefficients in such a manner that a format conversion coefficient at boundary points of the respective blocks which are divided from an input image into a plurality of block under the control of the block division and control signal generating part is in conformity with a format conversion coefficient at points when the input image is processed by a singe block.

15. An apparatus for converting a format for claim 12, wherein the format conversion coefficient generating part generates format conversion coefficients differently for the respective blocks which are divided under the block division and control signal generating part for performing the format conversion of blocks with different input and output sizes.

16. An apparatus for converting a format for claim 12, wherein the synchronizing signal generating part generates vertical and horizontal synchronizing signals differently for the respective blocks which are divided under the control of the block division and control signal generating part for performing the format conversion of blocks with different input and output sizes.

17. An apparatus for converting a format for claim 12, wherein the format conversion part comprises:

a memory buffer part including a plurality of buffers for temporarily storing images input per block unit;

a vertical format conversion part for converting an image signal output from the memory buffer part in the vertical direction according to a format conversion coefficient generated from the format conversion coefficient generating part and a vertical synchronizing signal generated from the synchronizing signal generating part; and a horizontal format conversion part for converting an image signal output from the vertical format conversion part in the horizontal direction according to a format conversion coefficient generated from the format conversion coefficient generating part and a horizontal synchronizing signal generated from the synchronizing signal generating part.

18. An apparatus for converting a format for claim 12, further comprising a vertical filter and a horizontal filter respectively at a front end part of the vertical format conversion part and a front end part of the horizontal conversion part for limiting bandwidth of an input image.

* * * * *

UNITED STATES PATENT AND TRADEMARK OFFICE
CERTIFICATE OF CORRECTION

PATENT NO.      : 6,388,711 B1                                          Page 1 of 1
DATED           : May 14, 2002
INVENTOR(S)     : Dong Il Han et al.

It is certified that error appears in the above-identified patent and that said Letters Patent is hereby corrected as shown below:

Title page,
Item [30], please insert Foreign Application Priority Data, as follows:
-- [30]         Foreign Application Priority Data
Oct. 1, 1999    [KR]   Korea…………………………..1999-42399 --.

Signed and Sealed this

Seventeenth Day of December, 2002

JAMES E. ROGAN
*Director of the United States Patent and Trademark Office*